May 4, 1943.  L. PADLEY ET AL  2,318,326
ROCK DRILL
Filed March 6, 1941

INVENTORS:
LEONARD PADLEY
GEORGE ALFRED MORGAN
BY: Francis C. Boyce
ATTORNEY

Patented May 4, 1943

2,318,326

UNITED STATES PATENT OFFICE 2,318,326

ROCK DRILL

Leonard Padley and George Alfred Morgan, Sheffield, England

Application March 6, 1941, Serial No. 381,978
In Great Britain March 8, 1940

5 Claims. (Cl. 76—108)

This invention relates to detachable drill bits for rock drills of the kind which are attached to the drill rod by means of a separately formed connecting member fitting the socketed rear end of the drill bit and projecting therefrom and engaging the interiorly screw threaded end of the drill rod whereby in the assembled rock drill, the adjacent end faces of the drill rod and drill bit are maintained in close abutment so that shocks can be transmitted from the drill rod to the drill bit through the said abutting end faces.

The object of this invention is to provide improvements in the manufacture of such drill bits including a novel method of attaching the connecting member to the drill bit which will not only reduce the number of manufacturing steps required and entail less wastage of metal but will also speed up the rate of production and consequently effect economy in the cost of manufacture.

In the improved method of manufacturing a drill bit of the before indicated kind according to this invention, the said drill bit is formed into drill bit shape between dies by forging a heated solid metal slug in contact with a preformed connecting member whereby to cause the connecting member to penetrate the slug as the latter is transformed into drill bit shape and thereby seat itself in position projecting from the resultant drill bit blank thus formed.

The connecting member itself is therefore utilised as the means for forming the socket in the drill bit which accommodates it and in the act of thus forming the socket, the connecting member becomes positioned fixedly therein, or loosely therein either removably or non-removably as is predetermined by the particular formation of the embedded portion of the said connecting member and which embedded portion may be of any suitable shape and cross section.

The connecting member may be rotationally accommodated in the drill bit and be removable therefrom or non-removable and constitute a floating connecting member.

The embedded portion of the connecting member may be of round cross section with its periphery screw threaded in continuity with or interruptedly of the screw threaded projecting end and in the former case the connecting member may be removable but in the latter case it would not be removable but may be partly rotatable.

Alternatively the embedded portion of the connecting member may be of tapering, rectangular, or other suitable cross section which will prevent both its axial and rotational movement relative to the drill bit.

Where the drill bit is for use with hollow drill rods and requires a hole through it to constitute a passage for water for flushing the hole to be bored in the rock by the drill, the connecting member and the drill bit together may be drilled axially for the purpose. Alternatively, the connecting member employed may be hollow, as for example by being previously drilled, and any metal which enters the bore of the connecting member during forging of the drill bit can be drilled out when drilling the hole in the drill bit.

As a further alternative, the connecting member may be hollow up to a very short distance from its inner end, thus leaving a closed end to prevent inflow of metal and this closed end can afterwards be drilled out.

Referring to the drawing filed herewith which is illustrative of the method of manufacturing drill bits according to this invention:

Figure 1:
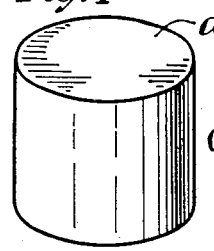
Fig. 1 is a perspective view of a metal slug.
Figure 2:
Fig. 2 is a perspective view of a screw threaded hollow connecting member.
Figures 3, 4:
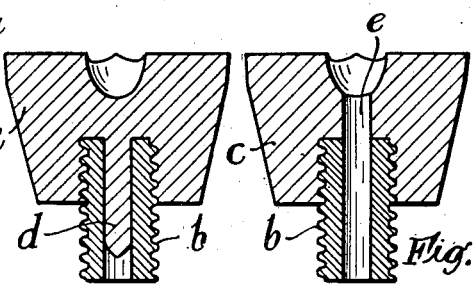
Fig. 3 is a longitudinal section of a drill bit forged to shape from the slug and connecting member of Figs. 1 and 2.
Fig. 4 is also a longitudinal section of the drill bit after the operation of drilling a hole in the bit and clearing extruded metal from the bore of the connecting member.
Figure 9:
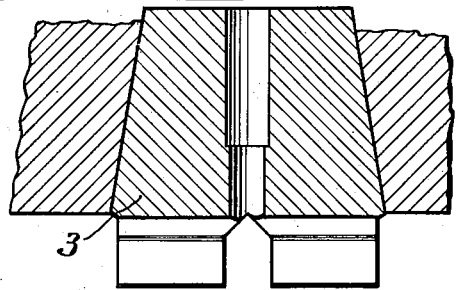
Fig. 9 is a vertical section of the upper die member.
Figure 5:
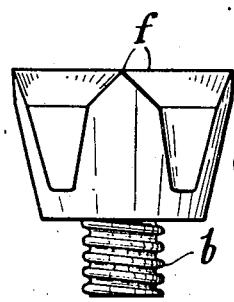
Fig. 5 is an elevation of the completed drill bit.

In proceeding to manufacture the drill bit from the heated solid metal slug *a* and the preformed hollow connecting member *b* (hereinafter referred to as a stud), the latter is positioned upright in the lower die member 2 of a pair of upper and lower dies and the heated slug is also positioned on the lower die member over the stud *b* in the requisite position so that as the upper die member 3 is operated downwards, the slug is forged under pressure between the dies and around the upper end of the stud $b$ to the drill bit formation shown in Fig. 3 except for the usual "flash" at the edges (not shown). It will be noted the upper end of the stud $b$ has thereby pierced and become embedded in the drill bit blank $c$ and some of the metal thereof has been extruded into the bore of the stud $b$ as indicated at $d$. After "flashes" have been removed the next operation is to drill the hole $e$, Fig. 4, in the drill bit blank in register with the bore of the stud $b$ and continue drilling until the said bore is clear. This drilling is effected from the operative or cutting end of the drill bit blank and the finished drill bit is depicted in Fig. 5 with cutting edges $f$.

Figure 6:
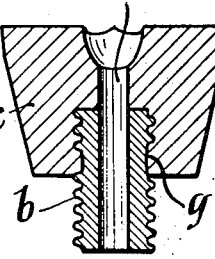
Fig. 6 is a longitudinal section of an alternative construction of bit.

It will be seen that the metal of the drill bit immediately around the screw threaded periphery of the stud $b$ automatically conforms to the screw threads thereof during forging of the bit and the stud may be capable of being turned on its threads. If however it is desired that the stud should be non-removable, interruption of the screw thread by the absence of one or two threads as shown at $g$ in Fig. 6 will achieve this object although it might be found that a little relative rotation between the bit and stud is possible which however may not be a disadvantage.

The formation automatically of the screw threaded interior of the socket in the bit during forging of the latter obviates the necessity for tapping the screw threads in a pre-drilled or pre-formed socket as is usually done.

Figure 7:
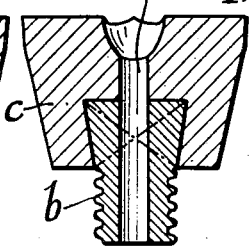
Fig. 7 is a similar view of a still further alternative construction.

The embedded end of the stud $b$ need not however be screw threaded and by way of one example of alternative, the embedded end of the stud $b$ shown in Fig. 7 has a dove-tail formation which prevents both axial and rotational movement of the stud relative to the bit.

Figure 8:
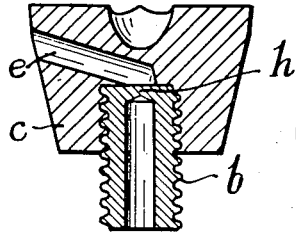
Fig. 8 is another longitudinal section showing yet a further alternative.
Figure 10:
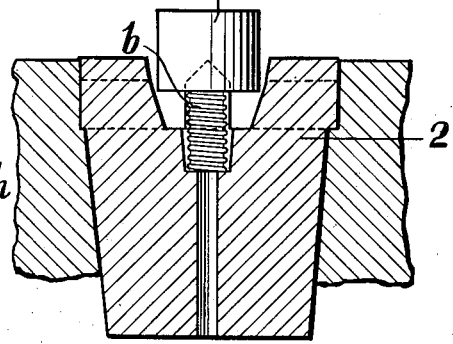
Fig. 10 is a similar section of the lower die member of a pair of dies for forging drill bits in accordance with this invention, a metal slug and a connecting member being shown in position in the lower die member ready for subjection to the forging operation.

Fig. 8 shows another construction of drill bit in which the hole $e$ therein is drilled from the side and not axially.

Instead of utilising a completely hollow stud $b$ one may be employed such as is shown in Fig. 8 in which the preformed hole in the stud $b$ terminates within a short distance of the end so as to leave a web $h$ of metal sufficient to resist the entry of metal of the slug into the bore of the stud, this web $h$ being afterwards easily drilled out.

What we claim and desire to secure by Letters Patent is:

1. The method of manufacturing a two-piece drill bit which comprises forging a heated solid metal slug to drill bit formation in contact with a cold preformed metal stud thereby to cause one end of said stud to pierce and embed itself in the slug simultaneously with the formation of a front cutting end and a rear exposed drill-rod-abutment face on said slug, the other end of the stud projecting axially from said face.

2. The method of manufacturing a two-piece drill bit which comprises positioning a cold preformed metal stud and a heated solid metal slug in adjacent relation to one another in a pair of dies and operating the dies to forge the slug to drill bit formation and simultaneously cause one end of the stud to pierce and thereby make its own entry into said solid slug so as to become embedded therein while the other end of said stud extends axially beyond said slug.

3. The method of manufacturing a two-piece drill bit which comprises positioning a cold preformed metal stud and a heated solid metal slug in adjacent relation to one another in one member of a pair of dies and operating the other die member to forge the slug into drill bit formation to impart cutting faces at one end and a drill-rod-abutment face at the opposite end of said slug, the operation of the said other die member simultaneously causing the end of the stud lying adjacent the slug to pierce and thereby make its own entry into said slug so as to become embedded axially therein while the opposite end of said stud extends axially beyond the said drill-rod-abutment face of the slug.

4. The method of manufacturing a two-piece drill bit which comprises positioning a cold preformed tubular metal stud and a heated solid metal slug in adjacent relation to one another in one member of a pair of dies, operating the other die member to forge the slug into drill bit formation to impart cutting faces at one end and a drill-rod-abutment face at the opposite end of said slug, the operation of said other die member simultaneously causing the end of the stud lying adjacent the slug to pierce and thereby make its own entry into said slug so as to become embedded axially therein while the opposite end of said stud extends axially beyond the said drill-rod-abutment face of the slug, boring the slug from the end thereof opposite the tubular stud and continuing the boring axially of said stud to remove therefrom metal forced thereinto under pressure of the dies.

5. The method of manufacturing a two-piece drill bit which comprises forging a heated solid metal slug to drill bit formation in contact with a cold preformed exteriorly threaded metal stud thereby to cause one end of said stud to pierce and embed itself in the slug in threaded engagement therewith simultaneously with the formation of a front cutting end and a rear exposed drill-rod-abutment face on said slug, the other end of the stud projecting axially from said face.

LEONARD PADLEY.
GEORGE ALFRED MORGAN.